(12) United States Patent
Harris

(10) Patent No.: US 8,040,100 B2
(45) Date of Patent: Oct. 18, 2011

(54) AUTOMATICALLY DETERMINING OPTIMAL PULSE DURATION FOR A STEPPER MOTOR

(75) Inventor: Richard Hunter Harris, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 12/140,024

(22) Filed: Jun. 16, 2008

(65) Prior Publication Data

US 2009/0309534 A1 Dec. 17, 2009

(51) Int. Cl.
G05B 19/40 (2006.01)

(52) U.S. Cl. .................................... 318/685; 318/696

(58) Field of Classification Search .................. 318/685, 318/696, 569, 600
See application file for complete search history.

(56) References Cited

U.S. PATENT DOCUMENTS

| | | | |
|---|---|---|---|
| 5,977,739 A | 11/1999 | Ohsawa | |
| 6,014,000 A | 1/2000 | Gutierrez | |
| 6,462,502 B1 | 10/2002 | Inui et al. | |
| 6,471,588 B2 * | 10/2002 | Sakamoto | 463/20 |
| 7,049,785 B2 | 5/2006 | Han | |
| 7,171,578 B2 | 1/2007 | McNutt | |
| 7,327,116 B2 | 2/2008 | Kuo | |
| 7,332,887 B2 * | 2/2008 | Ryuzaki | 318/685 |

* cited by examiner

Primary Examiner — Rina Duda
(74) Attorney, Agent, or Firm — Yee & Associates, P.C.; Thomas E. Tyson

(57) ABSTRACT

A system for calculating control pulse duration for optimal stepper motor performance. Duration of control pulses to a stepper motor is increased until stepper motor function begins. The duration of control pulses continues to be increased. It is determined whether stepper motor failure is detected. In response to detecting a failure, the duration of control pulses at the time of the failure is recorded. The duration of control pulses is decreased until stepper motor function is restored. The duration of control pulses continues to be decreased. It is determined whether a second failure is detected. In response to detecting a second failure, the duration of control pulses at the time of the second failure is recorded. A control pulse duration is calculated that optimizes performance of the stepper motor using recorded control pulse duration data. The calculated control pulse duration is applied to the stepper motor.

19 Claims, 6 Drawing Sheets

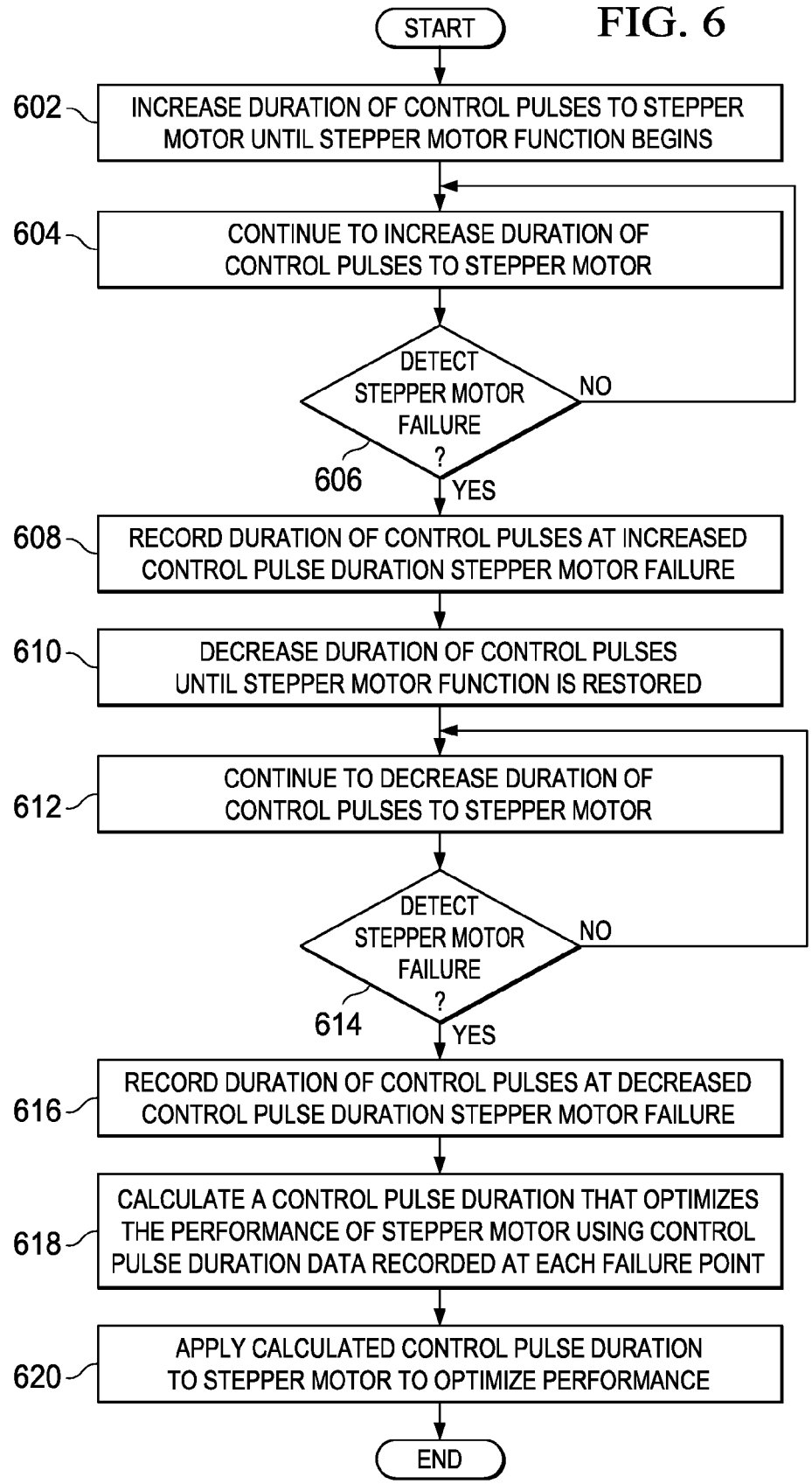

AUTOMATICALLY DETERMINING OPTIMAL PULSE DURATION FOR A STEPPER MOTOR

BACKGROUND OF THE INVENTION

1. Field of the Invention

The present invention relates generally to an improved data processing system and more specifically to a computer implemented method, system, and computer usable program code for automatically determining control pulse duration to optimally drive a stepper motor.

2. Description of the Related Art

A stepper motor is a brushless, synchronous electric motor that divides a full motor rotation into a number of steps. Generally, a stepper motor is used in a variety of paper handling equipment, such as, printers, because the stepper motor is controllable by a digital signal, is capable of controlling a wide range of speed, is capable of highly accurate positioning, and is capable of changing rotating direction. As a result, one or more stepper motors may be used in a printer to move, for example, the print head and paper in the printing mechanism to produce highly accurate print jobs.

In printers, various driving data is prepared beforehand for each stepper motor. The driving data is stored, for example, in memory in the printer. A control unit, such as a central processing unit (CPU) or microprocessor, executes firmware that utilizes the driving data to drive the stepper motor. The CPU outputs a control signal, which is usually a pulse signal, to control the operation of the stepper motor.

BRIEF SUMMARY OF THE INVENTION

According to one embodiment of the present invention, a control pulse duration is automatically calculated to optimize stepper motor performance. A duration of control pulses to a stepper motor is increased until stepper motor function begins. The duration of the control pulses to the stepper motor continues to be increased. It is determined whether an initial failure of the stepper motor is detected. In response to determining that an initial failure of the stepper motor is detected, the duration of the control pulses at the time of the initial failure is recorded in a table. Then, the duration of the control pulses after the initial failure of the stepper motor is decreased until the stepper motor function is restored. The duration of the control pulses to the stepper motor continues to be decreased. It is determined whether a second failure of the stepper motor is detected. In response to determining that a second failure of the stepper motor is detected, the duration of the control pulses at the time of the second failure is recorded in the table. A control pulse duration is calculated that optimizes performance of the stepper motor using control pulse duration data recorded in the table at the time of the initial failure and at the time of the second failure. Then, the calculated control pulse duration is applied to the stepper motor to optimize the performance of the stepper motor.

BRIEF DESCRIPTION OF THE SEVERAL VIEWS OF THE DRAWINGS

FIG. 6 is a flowchart illustrating an exemplary process for automatically calculating control pulse duration for optimal stepper motor performance in accordance with an illustrative embodiment.

DETAILED DESCRIPTION OF THE INVENTION

Figure 1:
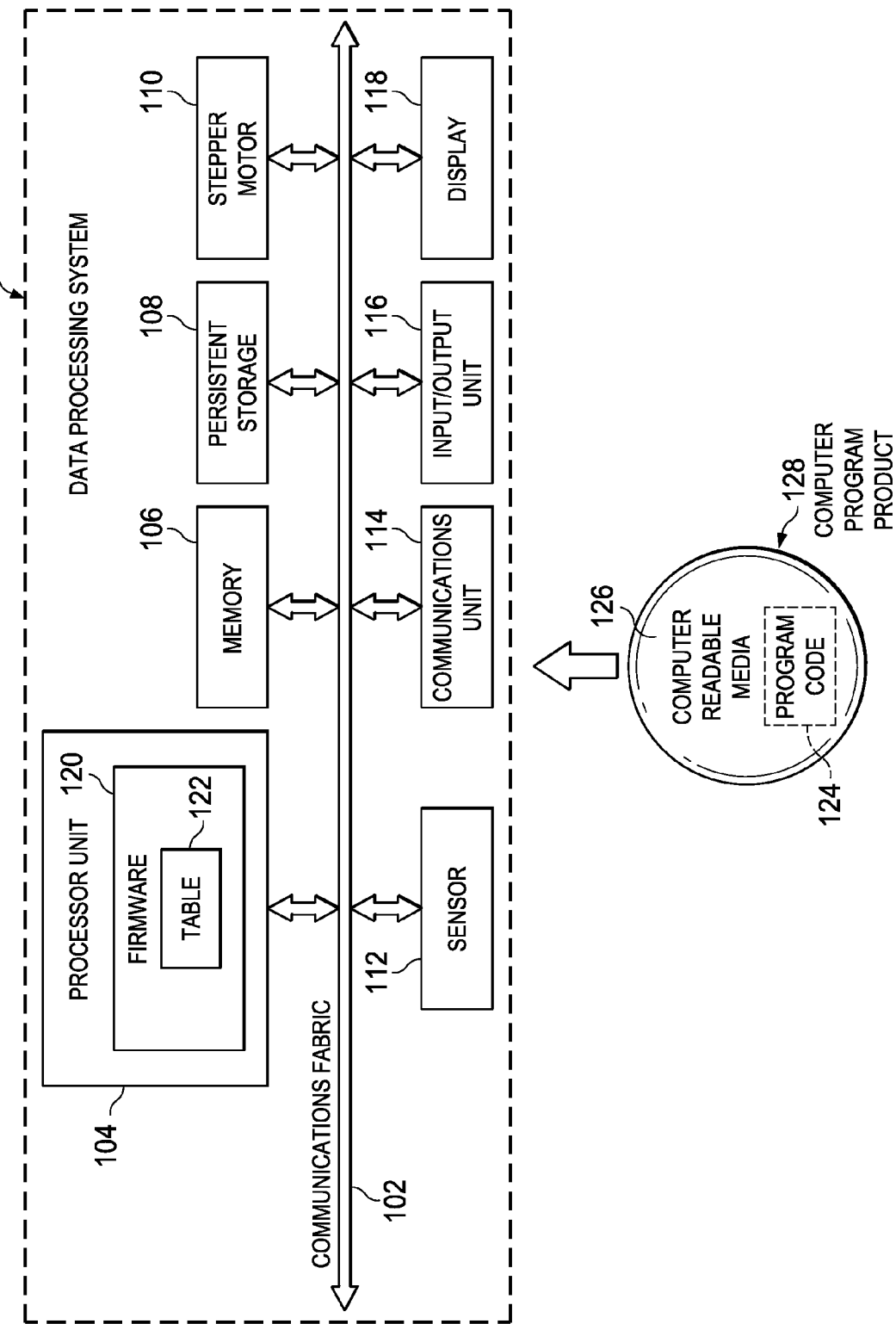
FIG. 1 is a diagram of a data processing system in which illustrative embodiments may be implemented.

As will be appreciated by one skilled in the art, illustrative embodiments may be embodied as a system, method, or computer program product. Accordingly, the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the illustrative embodiments may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the illustrative embodiments may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

An exemplary illustrative embodiment is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to the environments in which different embodiments may be implemented. Many modifications to the depicted environment may be made.

FIG. 1 depicts a diagram of a data processing system in which illustrative embodiments may be implemented. Data processing system 100 may, for example, be a retail point of sale printer. In this illustrative example, data processing system 100 includes communications fabric 102, which provides communications between processor unit 104, memory 106, persistent storage 108, stepper motor 110, sensor 112, communications unit 114, input/output (I/O) unit 116, and display 118.

Processor unit 104 provides the processing power of data processing system 100 and serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Processor unit 104 may, for example, provide diagnostics, booting, initialization, configuration, and run time error detection and correction for data processing system 100. Processor unit 104 includes firmware 120. Firmware 120 is microcode that is embedded in processor unit 104. Processor unit 104 may, for example, use this microcode to drive stepper motor 110 during operation of data processing system 100.

Firmware 120 includes table 122, which may represent one or more tables. Table 122 includes control pulse duration data for stepper motor 110. Processor unit 104 uses the control pulse duration data in table 122 to drive stepper motor 110. In addition, table 122 may include a set of multiplication factors. Processor unit 104 may use a multiplication factor in the set of multiplication factors to multiply a control pulse duration to obtain an optimal control pulse duration for stepper motor 110. Further, table 122 may also include specification data, such as motor type (i.e., part number) and manufacturing tolerances, for stepper motor 110.

Memory 106 and persistent storage 108 are examples of storage devices. A storage device is any piece of hardware that is capable of storing information either on a transient basis and/or a persistent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Data processing system 100 uses stepper motor 110 to perform one or more operations, such as, for example, moving a document impact print head and/or a document in a print station. Data processing system 100 utilizes sensor 112 to monitor stepper motor 110. For example, data processing system 100 may use sensor 112 to determine whether stepper motor 110 is synchronized or not. Sensor 112 may detect that stepper motor 110 is not synchronized by, for example, determining that stepper motor 110 is not in a correct position. If sensor 112 determines that stepper motor 110 is not in the correct position, then sensor 112 may send a home error message to processor unit 104. Sensor 112 may be any type of sensor capable of being utilized by processes of illustrative embodiments.

Communications unit 114 provides for communication capabilities with other data processing systems or devices. For example, communications unit 114 may be a network interface card. Communications unit 114 may provide communications through the use of either, or both, physical and wireless communications links.

Input/output unit 116 allows for input and output of data with other devices that may be connected to data processing system 100. For example, input/output unit 116 may provide a connection for user input through a keyboard, keypad, touch screen, and/or mouse. Further, input/output unit 116 may send output to a network printer. Display 118 provides a mechanism to display information to a user of data processing system 100.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 124 is located in a functional form on computer readable media 126 that is selectively removable and may be loaded onto or transferred to data processing system 100 for execution by processor unit 104. Program code 124 and computer readable media 126 form computer program product 128 in these examples. In one example, computer readable media 126 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 126 may also take the form of a persistent storage, such as a hard drive, a thumb drive, or a flash memory that is connected to data processing system 100. The tangible form of computer readable media 126 is also referred to as computer recordable storage media. In some instances, computer readable media 126 may not be removable.

Alternatively, program code 124 may be transferred to data processing system 100 from computer readable media 126 through a communications link to communications unit 114 and/or through a connection to input/output unit 116. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 may be varied from the illustrative examples shown.

As one example, a storage device in data processing system 100 is any hardware apparatus that may store data. Memory 106, persistent storage 108 and computer readable media 126 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may, for example, be memory 106 or a cache such as found in an interface and memory controller hub that may be present in communications fabric 102.

Illustrative embodiments provide a computer implemented method, system, and computer usable program code for automatically calculating a control pulse duration for optimal stepper motor performance. Firmware located in a processing unit increases the duration of control pulses to a stepper motor until stepper motor function begins. The firmware continues to increase the duration of the control pulses to the stepper motor. The firmware determines whether an initial failure of the stepper motor is detected by a sensor. In response to determining that an initial failure of the stepper motor is detected, the firmware records the duration of the control pulses at the time of the initial failure in a table located in the firmware.

Then, the firmware decreases the duration of the control pulses after the initial failure of the stepper motor until stepper motor function is restored. The firmware continues to decrease the duration of the control pulses to the stepper motor. The firmware determines whether a second failure of the stepper motor is detected by the sensor. In response to determining that a second failure of the stepper motor is detected, the firmware records the duration of the control pulses at the time of the second failure in the table.

Then, the firmware calculates a control pulse duration that optimizes performance of the stepper motor using control pulse duration data recorded in the table at the time of the initial failure and at the time of the second failure. The firmware applies the calculated control pulse duration to the stepper motor to optimize the performance of the stepper motor. Optimal stepper motor performance matches the energy input into the stepper motor with the load characteristics of the stepper motor.

Currently, the manufacturer that produces the stepper motor for a particular point of sale printer is discontinuing production of that stepper motor and is producing a new stepper motor that is similar, but not quite equal to the old stepper motor. Tests show that this new stepper motor requires a firmware change that is specific to this new motor because this new motor is more powerful than the old motor, which causes the new motor to be loud during starts and stops. In addition, this increased power also causes the new stepper motor to occasionally lose synchronization or to stumble. A firmware patch solves the loss of synchronization or stumble problem, but the noise problem still remains.

Illustrative embodiments resolve both the noise and stumbling problems. Further, illustrative embodiments optimize stepper motor performance with the load characteristics of the point of sale printer. Thus, illustrative embodiments allow the new stepper motor and the old stepper motor to work with the same firmware, which automatically determines the optimal control pulse duration for either stepper motor. Furthermore, illustrative embodiments take into account motor types (i.e., part numbers) and manufacturing tolerances for the different stepper motors. Also, the illustrative embodiments compensate for the manufacturing tolerances that effect motor performance to ensure that every motor is performing to its maximum capability.

Illustrative embodiments require a table of control pulse durations and multiplication factors for determining the optimal duration of the control pulse, which is then applied to the stepper motor. It should be noted that the frequency of the control pulses does not change, but only the duration or length of the control pulses. This process results in weaker stepper motors being driven by longer pulse durations and stronger stepper motors being driven by shorter pulse durations. Illustrative embodiments provide an automatic determination of the exact pulse length required for any stepper motor, as long as the stepper motor is able to drive the impact print head within a predetermined range of pulse durations. The result is that each stepper motor is perfectly matched to the load characteristics of the point of sale printer, without the need for time consuming motor tests and printer load measurements.

Figure 2:
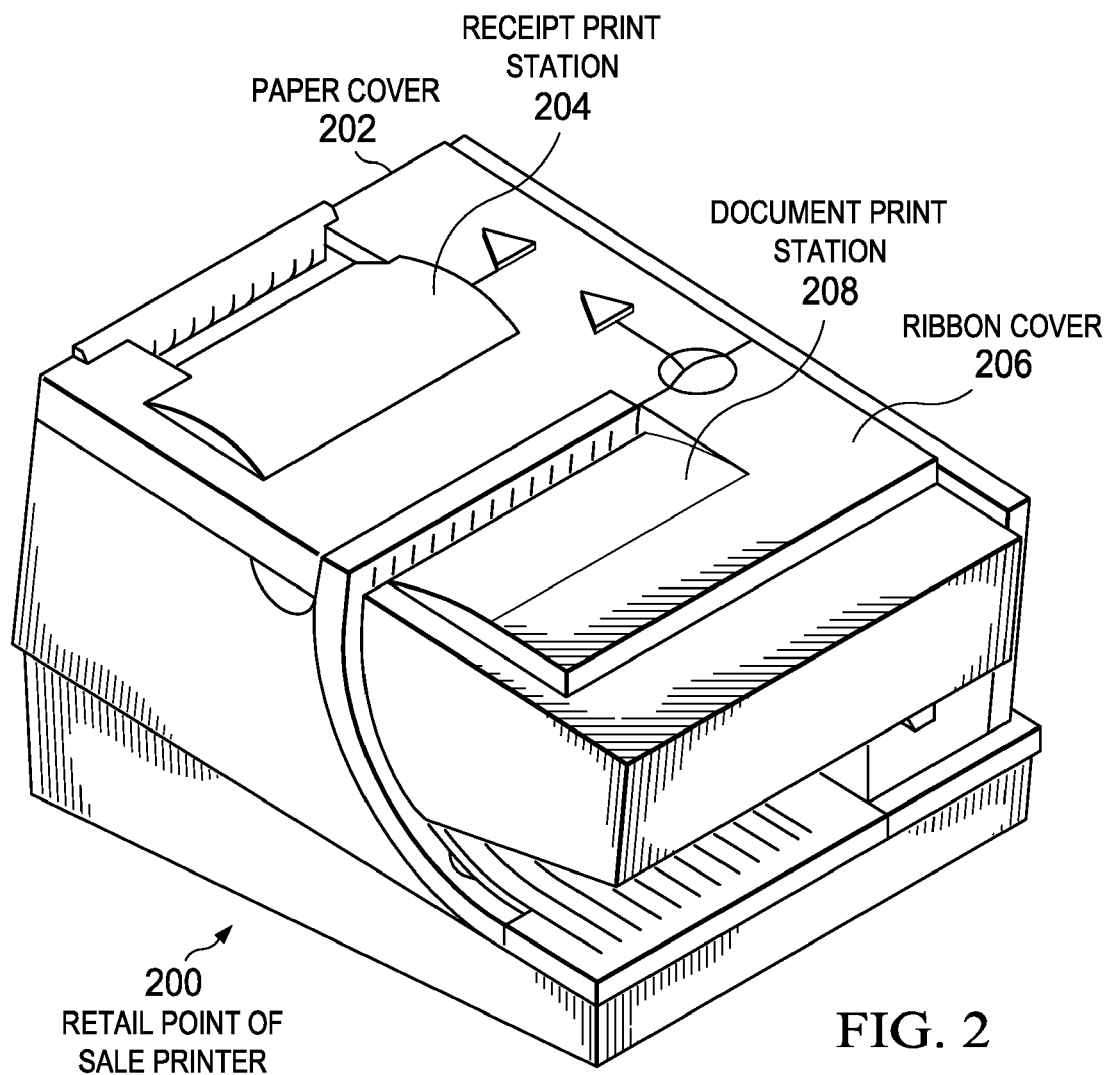
FIG. 2 is a pictorial representation of a retail point of sale printer in accordance with an illustrative embodiment.

With reference now to FIG. 2, a pictorial representation of a retail point of sale printer is depicted in accordance with an illustrative embodiment. Retail point of sale printer 200 may, for example, be implemented in data processing system 100 in FIG. 1. Retail point of sale printer 200 is coupled to a point of sale device, such as a cash register, or a network of point of sale devices. A point of sale device uses retail point of sale printer 200 to print transaction receipts and to print data on documents, such as checks. Retail point of sale printer 200 includes paper cover 202, receipt print station 204, ribbon cover 206, and document print station 208. Retail point of sale printer 200 uses receipt print station 204 to print the transaction receipts and document print station 208 to print data on documents.

Figure 3:
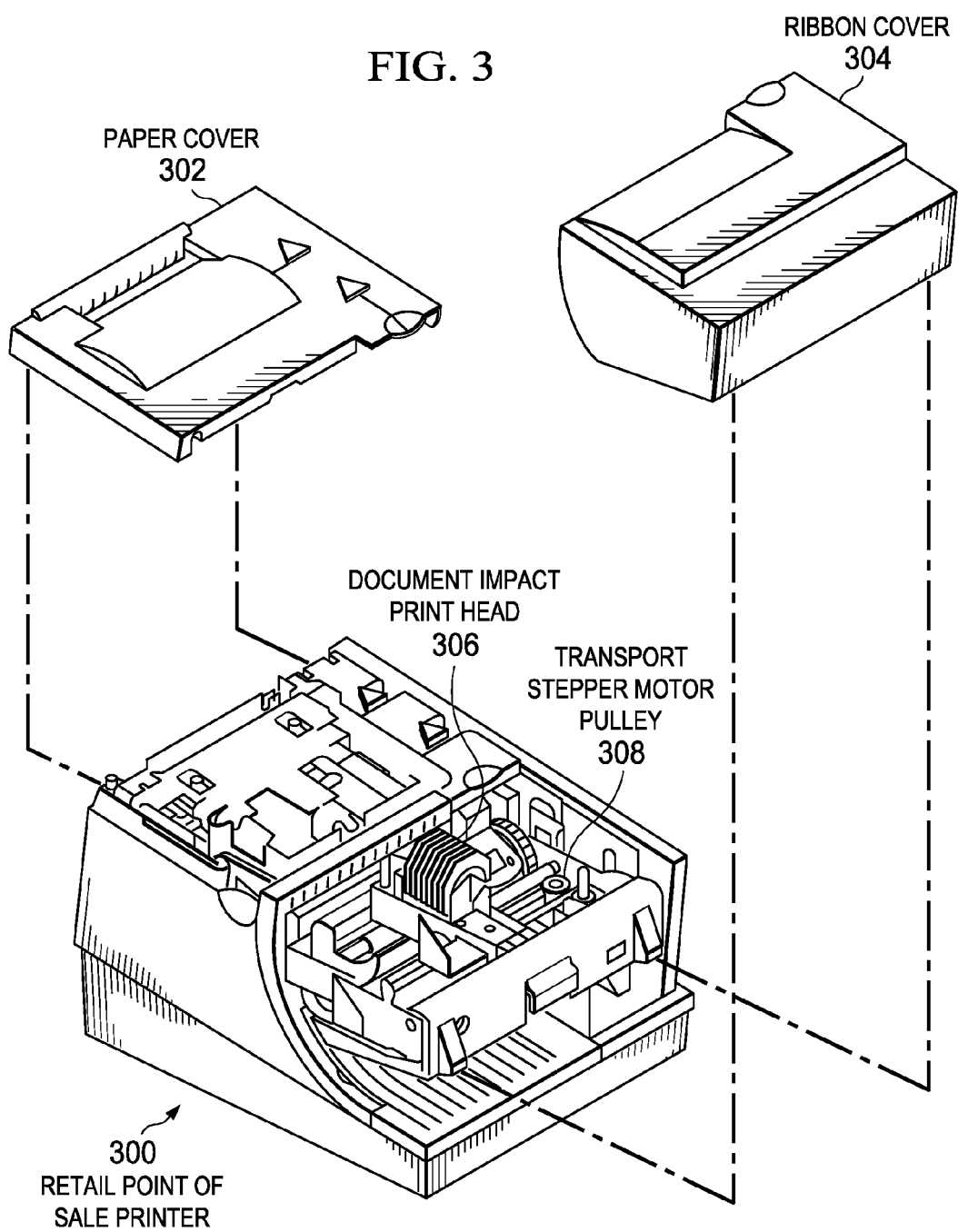
FIG. 3 is a pictorial representation of a retail point of sale printer with covers removed in accordance with an illustrative embodiment.

With reference now to FIG. 3, a pictorial representation of a retail point of sale printer with covers removed is depicted in accordance with an illustrative embodiment. Retail point of sale printer 300 may, for example, be retail point of sale printer 200 in FIG. 2. Retail point of sale printer 300 illustrates a point of sale printer with paper cover 302 and ribbon cover 304 removed to expose internal components, such as document impact print head 306 and transport stepper motor pulley 308, within retail point of sale printer 300. Paper cover 302 and ribbon cover 304 may, for example, be paper cover 202 and ribbon cover 206 in FIG. 2.

Retail point of sale printer 300 uses document impact print head 306 to print data on documents in the document print station, such as document print station 208 in FIG. 2. Transport stepper motor pulley 308 connects to document impact print head 306. Retail point of sale printer 300 uses transport stepper motor pulley 308 to properly position document impact print head 306 over the document during a print operation. A stepper motor, which is shown in the illustrative example of FIG. 4, drives transport stepper motor pulley 308.

Figure 4:
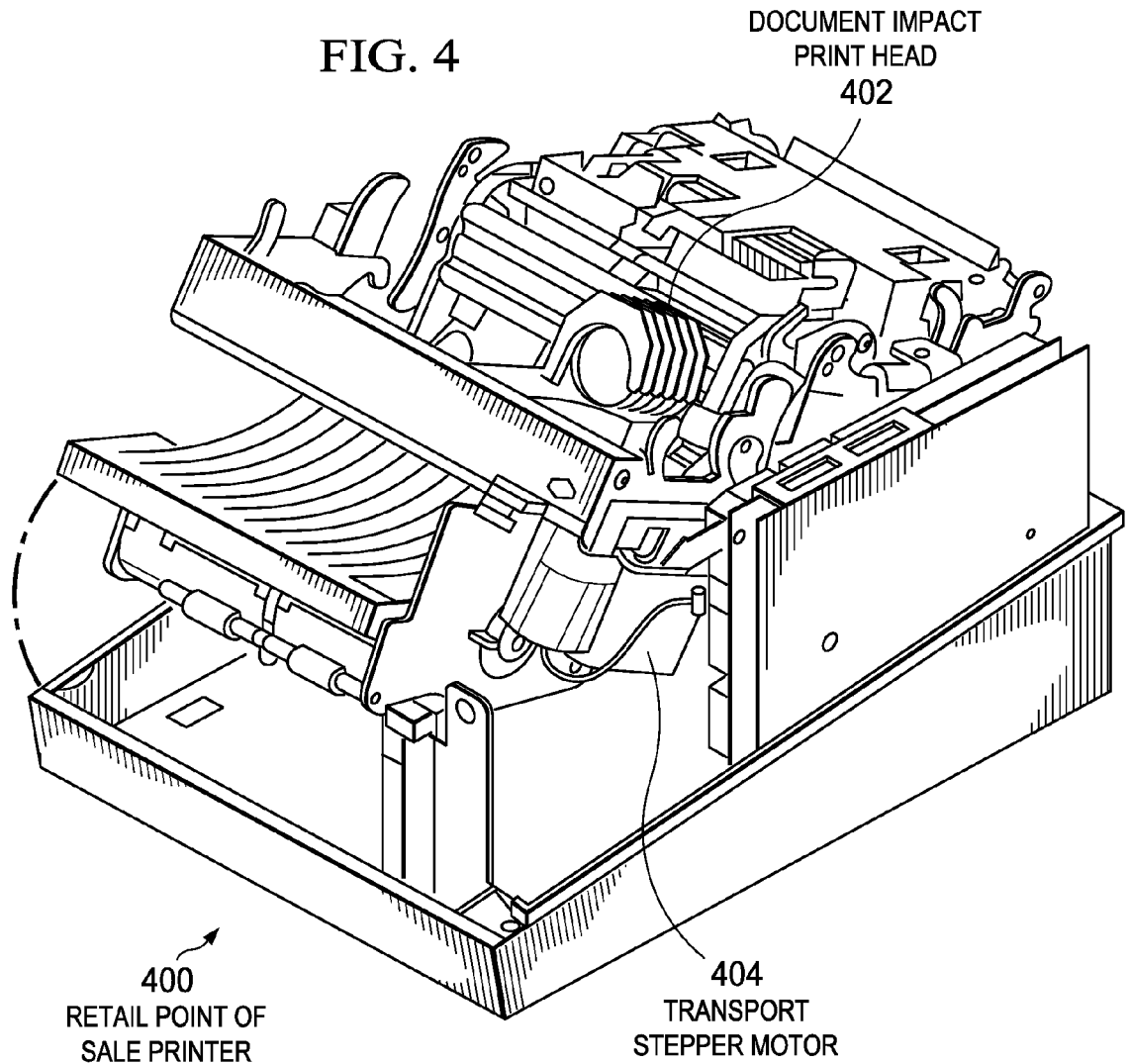
FIG. 4 is a pictorial representation of a retail point of sale printer showing a stepper motor in accordance with an illustrative embodiment.

With reference now to FIG. 4, a pictorial representation of a retail point of sale printer showing a stepper motor is depicted in accordance with an illustrative embodiment. Retail point of sale printer 400 may, for example, be retail point of sale printer 300 in FIG. 3. Retail point of sale printer 400 includes document impact print head 402 and transport stepper motor 404. Document impact print head 402 may, for example, be document impact print head 306 in FIG. 3. Retail point of sale printer 400 utilizes transport stepper motor 404 to drive a transport pulley, such as transport stepper motor pulley 308 in FIG. 3, to transport document impact print head 402 back and forth over a document during a print operation. Transport stepper motor 404 may, for example, be stepper motor 110 in FIG. 1.

Figure 5:
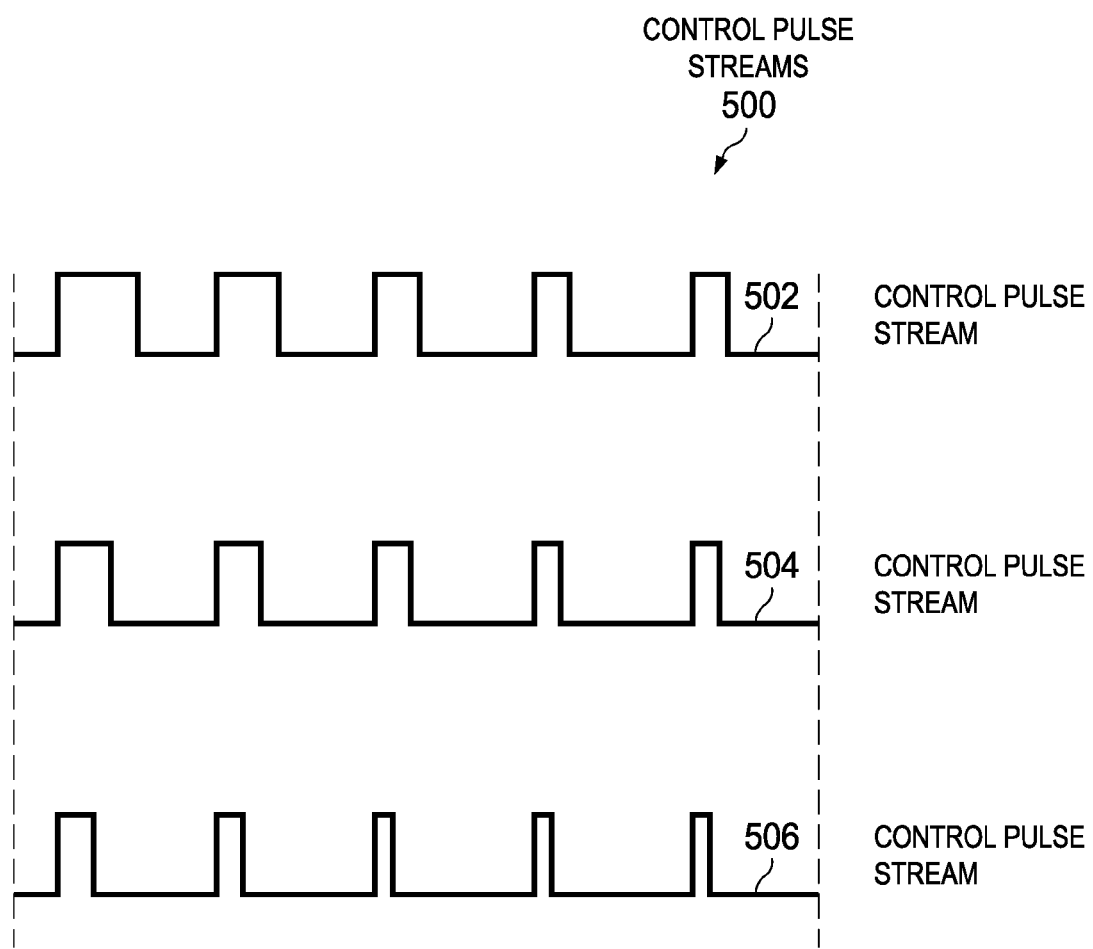
FIG. 5 is an exemplary illustration of control pulse streams in accordance with an illustrative embodiment.

With reference now to FIG. 5, an exemplary illustration of control pulse streams is depicted in accordance with an illustrative embodiment. Control pulse streams 500 are voltage pulses that are used to drive a single coil in a stepper motor, such as transport stepper motor 404 in FIG. 4. Control pulse streams 500 includes control pulse stream 502, control pulse stream 504, and control pulse stream 506.

In this illustrative example, control pulse stream 502 is defined as a 100% pulse duration stream. Control pulse stream 502 may, for example, be a set of pulse durations that drive the weakest stepper motor capable of performing the print load for a retail point of sale printer, such as retail point of sale printer 400 in FIG. 4. Control pulse stream 504 is defined as a 50% pulse duration stream. In other words, control pulse stream 504 is the pulse stream obtained when firmware, such as firmware 120 in FIG. 1, multiplies each pulse duration in control pulse stream 502 by 50%. Control pulse stream 506 is defined as a 30% pulse duration stream. In other words, control pulse stream 506 is the pulse stream obtained when the firmware multiplies each pulse duration in control pulse stream 502 by 30%.

Control pulse streams 504 and 506 drive stronger stepper motors than the stepper motor driven by control pulse stream 502. It should be noted that the speed of the stepper motor is the same for control pulse streams 502, 504, and 506. Thus, illustrative embodiments demonstrate how the firmware may apply different multiplication factors to a control pulse stream to drive different stepper motors having various drive torques.

The multiplication factor is determined when the stepper motor is placed in the point of sale printer. The stepper motor may be placed in the point of sale printer at the time of manufacture or when a stepper motor needs to be replaced or changed. After assembly, the firmware applies a logical routine, which is used to optimize performance of the stepper motor in the point of sale printer.

The firmware applies control pulses of increasing duration until the point of sale printer begins to function. The firmware exercises the most demanding function of the point of sale printer as the pulse durations are increased until a failure occurs in the point of sale printer. This failure is usually a home error, which a sensor, such as sensor 112 in FIG. 1, may electrically detect. The firmware records the control pulse duration at this point of failure in a table, such as table 122 in FIG. 1.

After this failure is detected and recorded, the firmware starts decreasing the duration of the control pulses until function of the point of sale printer is once again restored. Exercising the most demanding function of the point of sale printer with decreasing control pulse durations will eventually cause another home error. The firmware records the durations of the control pulses at this second point of failure.

The optimal multiplication factor, which provides optimal stepper motor performance, is somewhere between these two recorded pulse duration bounds. For example, the optimal pulse duration may be the average pulse duration between the longest and shortest pulse duration for the recorded failures. However, it should be noted that knowledge of the relationship between noise, stepper motor drive, and other considerations may lead to a different selection of the optimal multiplication factor for the control pulse stream.

With reference now to FIG. 6, a flowchart illustrating an exemplary process for automatically calculating control pulse duration for optimal stepper motor performance is shown in accordance with an illustrative embodiment. The process shown in FIG. 6 may be implemented in a data processing system, such as data processing system 100 in FIG. 1.

The process begins when the data processing system utilizes firmware, such as firmware 120 in FIG. 1, to increase the duration of control pulses to a stepper motor, such as stepper motor 110 in FIG. 1, until stepper motor function begins (step 602). Subsequent to beginning stepper motor function in step 602, the firmware continues to increase the duration of the control pulses to the stepper motor (step 604). Afterward, the firmware makes a determination as to whether a sensor, such as sensor 112 in FIG. 1, detects a failure in the stepper motor (step 606). If the sensor does not detect stepper motor failure, no output of step 606, then the process returns to step 604 where the firmware continues to increase the duration of the control pulses. If the sensor does detect stepper motor failure, yes output of step 606, then the firmware records the duration of the control pulses at the increased control pulse duration stepper motor failure within a table, such as table 122 in FIG. 1 (step 608).

Subsequently, the firmware decreases the duration of the control pulses until stepper motor function is again restored (step 610). After restoring stepper motor function in step 610, the firmware continues to decrease the duration of the control pulses to the stepper motor (step 612). Then, the firmware makes a determination as to whether the sensor detects another failure of the stepper motor (step 614). If the sensor does not detect another stepper motor failure, no output of step 614, then the process returns to step 612 where the firmware continues to decrease the duration of the control pulses. If the sensor does detect another stepper motor failure, yes output of step 614, then the firmware records the duration of the control pulses at the decreased control pulse duration stepper motor failure within the table (step 616).

Afterward, the firmware calculates a duration of control pulses that optimizes the performance of the stepper motor using the control pulse duration data recorded at each failure point (step 618). Then, the firmware applies this calculated control pulse duration to the stepper motor to optimize stepper motor performance (step 620). The process terminates thereafter.

Thus, illustrative embodiments provide a computer implemented method, system, and computer program product for automatically calculating control pulse duration for optimal stepper motor performance. The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the exemplary preferred embodiment has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The embodiment can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the embodiment can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the preferred embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically calculating a control pulse duration for optimal stepper motor performance, the computer implemented method comprising:

increasing a duration of control pulses to a stepper motor until stepper motor function begins;

continuing to increase the duration of the control pulses to the stepper motor;

determining whether an initial failure of the stepper motor is detected;

responsive to determining that an initial failure of the stepper motor is detected, recording the duration of the control pulses at a time of the initial failure in a table;

decreasing the duration of the control pulses after the initial failure of the stepper motor until the stepper motor function is restored;

continuing to decrease the duration of the control pulses to the stepper motor;

determining whether a second failure of the stepper motor is detected;

responsive to determining that a second failure of the stepper motor is detected, recording the duration of the control pulses at a time of the second failure in the table;

calculating a control pulse duration that optimizes performance of the stepper motor using control pulse duration data recorded in the table at the time of the initial failure and at the time of the second failure; and applying the calculated control pulse duration to the stepper motor to optimize the performance of the stepper motor.

2. The computer implemented method of claim 1, wherein the control pulse duration is calculated by determining an average control pulse duration between the duration of the control pulses recorded at the time of the initial failure and the duration of the control pulses recorded at the time of the second failure.

3. The computer implemented method of claim 1, wherein the control pulse duration is calculated by multiplying the duration of control pulses by a multiplication factor.

4. The computer implemented method of claim 1, wherein optimal stepper motor performance matches an energy input into the stepper motor with load characteristics of the stepper motor.

5. The computer implemented method of claim 1, wherein the stepper motor is located in a retail point of sale printer.

6. The computer implemented method of claim 5, wherein the stepper motor is used to drive an impact print head within the retail point of sale printer.

7. The computer implemented method of claim 1, wherein the increasing, continuing, determining, recording, decreasing, calculating, and applying steps are executed by firmware.

8. The computer implemented method of claim 7, wherein the table is located within the firmware, and wherein the firmware is located within a processor unit.

9. The computer implemented method of claim 1, wherein the table includes a set of multiplication factors used to calculate the control pulse duration.

10. The computer implemented method of claim 1, wherein the table includes specification data for the stepper motor.

11. The computer implemented method of claim 1, wherein a sensor is used to detect the initial failure and the second failure of the stepper motor.

12. A data processing system for automatically calculating a control pulse duration for optimal stepper motor performance, comprising:
    a bus system;
    a storage device connected to the bus system, wherein the storage device includes a set of instructions; and
    a processing unit connected to the bus system, wherein the processing unit executes the set of instructions to increase a duration of control pulses to a stepper motor until stepper motor function begins; continue to increase the duration of the control pulses to the stepper motor; determine whether an initial failure of the stepper motor is detected; record the duration of the control pulses at a time of the initial failure in a table in response to determining that an initial failure of the stepper motor is detected; decrease the duration of the control pulses after the initial failure of the stepper motor until the stepper motor function is restored; continue to decrease the duration of the control pulses to the stepper motor; determine whether a second failure of the stepper motor is detected; record the duration of the control pulses at a time of the second failure in the table in response to determining that a second failure of the stepper motor is detected; calculate a control pulse duration that optimizes performance of the stepper motor using control pulse duration data recorded in the table at the time of the initial failure and at the time of the second failure; and apply the calculated control pulse duration to the stepper motor to optimize the performance of the stepper motor.

13. The data processing system of claim 12, wherein the stepper motor is located in a retail point of sale printer.

14. The data processing system of claim 13, wherein the stepper motor is used to drive an impact print head within the retail point of sale printer.

15. The data processing system of claim 12, wherein the table is located in firmware, and wherein the firmware is located within the processing unit.

16. A computer program product stored in a computer readable storage medium having computer usable program code embodied therein that is executable by a computer for automatically calculating a control pulse duration for optimal stepper motor performance, the computer program product comprising:
    computer usable program code for increasing a duration of control pulses to a stepper motor until stepper motor function begins;
    computer usable program code for continuing to increase the duration of the control pulses to the stepper motor;
    computer usable program code for determining whether an initial failure of the stepper motor is detected;
    computer usable program code for recording the duration of the control pulses at a time of the initial failure in a table in response to determining that an initial failure of the stepper motor is detected;
    computer usable program code for decreasing the duration of the control pulses after the initial failure of the stepper motor until the stepper motor function is restored;
    computer usable program code for continuing to decrease the duration of the control pulses to the stepper motor;
    computer usable program code for determining whether a second failure of the stepper motor is detected;
    computer usable program code for recording the duration of the control pulses at a time of the second failure in the table in response to determining that a second failure of the stepper motor is detected;
    computer usable program code for calculating a control pulse duration that optimizes performance of the stepper motor using control pulse duration data recorded in the table at the time of the initial failure and at the time of the second failure; and
    computer usable program code for applying the calculated control pulse duration to the stepper motor to optimize the performance of the stepper motor.

17. The computer program product of claim 16, wherein the control pulse duration is calculated by determining an average control pulse duration between the duration of the control pulses recorded at the time of the initial failure and the duration of the control pulses recorded at the time of the second failure.

18. The computer program product of claim 16, wherein the control pulse duration is calculated by multiplying the duration of the control pulses by a multiplication factor.

19. The computer program product of claim 16, wherein optimal stepper motor performance matches an energy input into the stepper motor with load characteristics of the stepper motor.

\* \* \* \* \*